United States Patent
Franke et al.

(10) Patent No.: US 6,499,440 B2
(45) Date of Patent: Dec. 31, 2002

(54) FOSSIL-FIRED STEAM GENERATOR

(75) Inventors: Joachim Franke, Altdorf (DE); Rudolf Kral, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/907,761

(22) Filed: Jul. 18, 2001

(65) Prior Publication Data

US 2002/0026906 A1 Mar. 7, 2002

Related U.S. Application Data

(63) Continuation of application No. PCT/DE00/00056, filed on Jan. 10, 2000.

(30) Foreign Application Priority Data

Jan. 18, 1999 (DE) .......................... 199 01 430

(51) Int. Cl.$^7$ .............................................. F22G 1/02
(52) U.S. Cl. ...................................... 122/459; 122/6 A
(58) Field of Search ............................. 122/1 B, 1 C, 122/4 D, 6 A, 406.4, 406.3, 459, 460, 451 S

(56) References Cited

U.S. PATENT DOCUMENTS

| | | | |
|---|---|---|---|
| 3,043,279 A | | 7/1962 | Blomquist et al. |
| 3,527,261 A | | 9/1970 | Bigler et al. |
| 3,927,646 A | * | 12/1975 | Dungey et al. ............. 122/6 A |
| 4,075,979 A | * | 2/1978 | Michel ..................... 122/406.4 |
| 4,665,865 A | * | 5/1987 | Zubrod ....................... 122/6 A |

FOREIGN PATENT DOCUMENTS

| | | |
|---|---|---|
| AT | 376 026 | 10/1984 |
| DE | 100 528 | 9/1973 |
| DE | 2734031 C2 | 7/1982 |
| DE | 4427859 A1 | 10/1995 |
| DE | 4431185 A1 | 3/1996 |
| DE | 19651678 A1 | 6/1998 |
| FR | 724.171 | 4/1932 |
| GB | 1163554 | 9/1969 |
| WO | PCT/DE99/01550 | 12/1999 |

OTHER PUBLICATIONS

Franke et al.: "Verdampferkonzepte für Benson®–Dampferzeuger" Evaporator concepts for Benson® steam generators, VGB Krafwerkstechnik vol. 73, Issue 4, dated 1993.

* cited by examiner

*Primary Examiner*—Gregory Wilson
(74) *Attorney, Agent, or Firm*—Laurence A. Greenberg; Werner H. Stemer; Ralph E. Locher

(57) ABSTRACT

A steam generator has a combustion chamber which is configured for an approximately horizontal main direction of flow of the fuel gas and which is followed on the fuel-gas side, via a horizontal gas flue, by a vertical gas flue. The containment walls of the combustion chamber are formed from evaporator tubes. Temperature differences between adjacent evaporator tubes of the combustion chamber are to be kept particularly low in all the load states of the steam generator. For this purpose, a first group and a second group of evaporator tubes can be acted upon in each case in parallel by a flow medium. The first group of evaporator tubes is connected in series with the second group.

21 Claims, 3 Drawing Sheets

FOSSIL-FIRED STEAM GENERATOR

CROSS-REFERENCE TO RELATED APPLICATION

This application is a continuation of copending International Application No. PCT/DE00/00056, filed Jan. 10, 2000, which designated the United States.

BACKGROUND OF THE INVENTION

Field of the Invention

The invention relates to a steam generator with a combustion chamber for fossil fuel. A horizontal gas flue and a vertical gas flue are provided downstream of the combustion chamber.

In a power plant with a steam generator, the energy content of a fuel is utilized for evaporating a flow medium in the steam generator. For the evaporation of a flow medium, the steam generator has evaporator tubes, the heating of which leads to the evaporation of the flow medium carried in them. The steam supplied by the steam generator may, in turn, be provided, for example, for a connected external process or else for driving a steam turbine. When the steam drives a steam turbine, a generator or a working machine is normally operated via the turbine shaft of the steam turbine. In the case of a generator, the current generated by the generator may be provided for feeding into an interconnected and/or island network.

In this context, the steam generator may be configured as a continuous-flow steam generator. A continuous-flow steam generator is known from the paper "Verdampferkonzepte für Benson-Dampferzeuger" [Evaporator concepts for Benson steam generators] by J. Franke, W. Köhler and E. Wittchow, published in VGB Kraftwerkstechnik 73 (1993), No. 4, p. 352–360. In a continuous-flow steam generator, the heating of steam generator tubes provided as evaporator tubes leads to the evaporation of the flow medium in the steam generator tubes in a single pass.

Steam generators are conventionally configured with a combustion chamber in a vertical form of construction. This means that the combustion chamber is configured for the heating medium or fuel gas to flow through in an approximately vertical direction.

At the same time, the combustion chamber may be followed on the fuel-gas side by a horizontal gas flue, the fuel-gas stream being deflected into an approximately horizontal flow direction at the transition from the combustion chamber into the horizontal gas flue. However, because of the thermally induced changes in length of the combustion chamber, combustion chambers of this type generally require a framework on which the combustion chamber is suspended. This necessitates a considerable technical outlay in terms of the production and the assembly of the steam generator, this outlay being the greater, the greater is the overall height of the steam generator.

The configuration of the containment wall of the gas flue or combustion chamber of the steam generator presents a particular problem with regard to the tube-wall or material temperatures which occur there. In the subcritical pressure range up to about 200 bar (20 MPa), the temperature of the containment wall of the combustion chamber is determined essentially by the level of the saturation temperature of the water when wetting of the inner surface of the evaporator tubes can be ensured. This is achieved, for example, by the use of evaporator tubes which have a surface structure on their inside. In particular, internally ribbed evaporator tubes come under consideration in this respect, of which the use in a continuous-flow steam generator is known, for example, from the abovementioned paper. These so-called ribbed tubes, that is to say tubes with a ribbed inner surface, have particularly good heat transmission from the tube inner wall to the flow medium.

Experience has shown that it is not possible to avoid containment walls of the combustion chamber being heated to a differing extent. As a result of the different heating of the evaporator tubes, therefore, the outlet temperatures of the flow medium from evaporator tubes heated to a greater extent are substantially higher than in the case of evaporator tubes heated normally or heated to a lesser extent. This may give rise to temperature differences between adjacent evaporator tubes, leading to thermal stresses which may reduce the useful life of the steam generator or even cause pipe cracks.

SUMMARY OF THE INVENTION

It is accordingly an object of the invention to provide a steam generator for fossil fuel which overcomes the abovementioned disadvantages of the heretofore-known steam generators of this general type and which requires a particularly low outlay with respect to its production and its assembly and in which, at the same time, temperature differences between adjacent evaporator tubes, when the steam generator is in operation, are kept particularly low.

With the foregoing and other objects in view there is provided, in accordance with the invention, a steam generator, including:

a combustion chamber for fossil fuel, the combustion chamber having a fuel-gas side;

a horizontal gas flue;

a vertical gas flue connected, via the horizontal gas flue, on the fuel-gas side to the combustion chamber;

the combustion chamber having burners provided substantially on a level with the horizontal gas flue;

the combustion chamber having containment walls formed from vertically disposed evaporator tubes welded to one another in a gastight manner;

a number of the evaporator tubes being subdivided into a first group and a second group, the first group and the second group of the evaporator tubes to be acted upon in each case in parallel by a flow medium;

the second group being provided in series with the first group and downstream of the first group as seen in a direction of flow of the flow medium;

the containment walls of the combustion chamber being subdivided into a first region and a second region along a main flow direction of a fuel gas flow;

the first region being formed from evaporator tubes of the first group and the second region being formed from evaporator tubes of the second group; and the second region being provided, on the fuel-gas side, between the first region and the horizontal gas flue.

In other words, the object of the invention is achieved by a steam generator with a combustion chamber for fossil fuel, which is followed on the fuel-gas side, via a horizontal gas flue, by a vertical gas flue, the combustion chamber including a number of burners provided on a level with the horizontal gas flue, wherein the containment walls of the combustion chamber are formed from vertically disposed evaporator tubes welded to one another in a gastight manner, a number of the evaporator tubes are subdivided into a first group and a second group, the first group and the second group of the evaporator tubes can be acted upon in each case in parallel by a flow medium, and the second group follows the first group of the evaporator tubes in series in the direction of flow of the flow medium, and in which the containment walls of the combustion chamber are subdivided into a first region and a second region in the main direction of flow of the fuel gas, the first region is formed from evaporator tubes of the first group and the second region from evaporator tubes of the second group, and the second region is provided, on the fuel-gas side, between the first region and the horizontal gas flue.

The invention is based on the idea that a steam generator which is to be set up at a particularly low outlay in terms of production and assembly should have a suspension structure which can be implemented in a simple manner. A framework to be set up at a comparatively low technical outlay for the suspension of the combustion chamber may, in this case, be accompanied by a particularly low overall height of the steam generator. A particularly low overall height of the steam generator can be achieved by the combustion chamber being configured in a horizontal form of construction. For this purpose, the burners are provided on a level with the horizontal gas flue in the combustion chamber wall. The fuel gas therefore flows through the combustion chamber in an approximately horizontal direction when the steam generator is in operation.

Moreover, when the horizontal combustion chamber is in operation, temperature differences between adjacent evaporator tubes should be particularly low in order reliably to avoid premature material fatigue. Where a horizontal combustion chamber is concerned, however, when the continuous-flow steam generator is in operation, the rear region of the combustion chamber, as seen on the fuel-gas side, is heated to a comparatively lesser extent than the front region of the combustion chamber, as seen on the fuel-gas side. Furthermore, for example, an evaporator tube in proximity to the burners is heated to a greater extent than an evaporator tube provided in a corner of the combustion chamber. At the same time, in an extreme case, the heat flow density may be about three times greater in the front region of the combustion chamber than in the rear region.

As regards the hitherto conventional mass flow densities, given in kg/m²s and with respect to a 100% steam power output (full load), of 2000 kg/m²s, the mass throughput decreases in a tube heated to a greater extent and increases in a tube heated to a lesser extent, in each case in relation to the average value of the mass throughput of all the tubes. This behavior is caused by the relatively high fraction of frictional pressure loss in the total pressure drop of the evaporator tubes. Moreover, because of the particularly low height of the horizontal combustion chamber, the relative differences in length of the evaporator tubes are substantially greater than in the case of a vertical combustion chamber. This additionally increases the differences in the heating and in the frictional pressure loss of the individual evaporator tubes. In order nevertheless to ensure approximately identical temperatures between adjacent evaporator tubes, a number of the evaporator tubes of the combustion chamber are advantageously subdivided into a first group and a second group. At the same time, the first group of evaporator tubes connected in parallel on the flow-medium side is connected in series, with respect to the flow medium, with the second group of evaporator tubes connected in parallel on the flow-medium side.

In the case of a series connection of the first group of evaporator tubes with the second group of evaporator tubes, it proves advantageous if the combustion chamber is subdivided into a first and a second region in the main direction of flow of the fuel gas, the first region being formed from evaporator tubes of the first group and the second region from evaporator tubes of the second group. At the same time, the second region is provided, on the fuel-gas side, between the first region and the horizontal gas flue. This is because, when the steam generator is in operation, that inlet portion of the evaporator tubes of the first region which is acted upon by flow medium has a comparatively lower temperature than the inlet portion of the evaporator tubes of the second region. To be precise, due to the series connection of the evaporator tubes, the second region is acted upon by flow medium which has already passed through the first region. The inlet portion of the horizontal gas flue likewise has a comparatively lower temperature than the inlet portion of the second region of the combustion chamber. Due to the combustion chamber being subdivided into regions, the evaporator tubes of which are connected in parallel in the main direction of flow of the fuel gas, temperature differences between adjacent evaporator tubes when the steam generator is in operation are particularly low.

Advantageously, the first group and the second group of evaporator tubes are in each case preceded by a common inlet header system and followed by a common outlet header system for the flow medium. A steam generator produced in this configuration allows reliable pressure compensation between the parallel-connected evaporator tubes and therefore a particularly favorable distribution of the flow medium during the flow through the evaporator tubes.

A containment wall for the combustion chamber is advantageously the end wall, the evaporator tubes can be acted upon in parallel by a flow medium.

The evaporator tubes of the end wall of the combustion chamber advantageously precede the first group of the evaporator tubes of the combustion chamber on the flow-medium side. This ensures particularly favorable cooling of the end wall.

In a further advantageous embodiment, the tube inside diameter of a number of the evaporator tubes of the combustion chamber is selected as a function of the respective position of the evaporator tubes in the combustion chamber. The evaporator tubes can thereby be adapted in the combustion chamber to a heating profile predeterminable on the gas side. The influence thus exerted on the flow through the evaporator tubes keeps temperature differences at the outlet of the evaporator tubes of the combustion chamber low in a particularly reliable way.

For a particularly good transmission of the heat of the combustion chamber to the flow medium carried in the evaporator tubes, a number of the evaporator tubes advantageously have on their inside in each case ribs which form a multistart thread. In this case, advantageously, a pitch angle a between a plane perpendicular to the tube axis and the flanks of the ribs provided on the tube inside is smaller than 60°, preferably smaller than 55°.

To be precise, in a heated evaporator tube configured as an evaporator tube without internal ribbing, a so-called smooth tube, the wetting of the tube wall necessary for a particularly good heat transmission can no longer be maintained beyond a specific steam content. In the absence of wetting, there may be a tube wall which is dry in places. The transition to a dry tube wall of this type leads to a kind of heat transmission crisis with an impaired heat transmission behavior, so that, in general, the tube-wall temperatures rise particularly sharply at this point. In an internally ribbed tube, however, in comparison with a smooth tube, this heat transmission crisis arises only at a mass steam content >0.9, that is to say shortly before the end of evaporation. This is attributable to the swirl which the flow experiences due to the spiral ribs. On account of the different centrifugal force, the water fraction is separated from the steam fraction and is pressed onto the tube wall. The wetting of the tube wall is thereby maintained to high steam contents, so that there are already high flow velocities at the location where the heat transmission crisis occurs. This gives rise, in spite of the heat transmission crisis, to good heat transmission and, as a result, to low tube-wall temperatures.

A number of the evaporator tubes of the combustion chamber advantageously have devices for reducing the throughflow of the flow medium. In this case, it proves particularly beneficial if these devices are configured as throttle devices. Throttle devices may be, for example, fittings, in particular throttle fittings or throttle valves in the evaporator tubes, these fittings reducing the tube inside diameter at a point within the respective evaporator tube.

At the same time, devices for reducing the throughflow in a line system, which includes a plurality of parallel lines and through which flow medium can be supplied to the evaporator tubes of the combustion chamber, also prove to be advantageous. In this case, the line system may also precede an inlet header system of evaporator tubes capable of being acted upon in parallel by flow medium. In this case, for example, throttle fittings or throttle accouterments may be provided in one line or in a plurality of lines of the line system. Such devices for reducing the throughflow of the flow medium through the evaporator tubes makes it possible to bring about an adaption of the throughput of the flow medium through individual evaporator tubes to respective heating of these in the combustion chamber. As a result, temperature differences of the flow medium at the outlet of the evaporator tubes are additionally kept particularly low in a particularly reliable way.

The side walls of the horizontal gas flue and/or of the vertical gas flue are advantageously formed from vertically disposed steam generator tubes which are welded to one another in a gastight manner and which are capable of being acted upon in each case in parallel by flow medium.

Adjacent evaporator or steam generator tubes are advantageously welded to one another in a gastight manner via metal bands, so-called fins. The fin width influences the introduction of heat into the steam generator tubes. The fin width is therefore adapted, preferably as a function of the position of the respective evaporator or steam generator tubes in the steam generator, to a heating profile predeterminable on the gas side. In this case, a typical heating profile determined from experimental values or else a rough estimation, such as, for example, a stepped heating profile, may be predetermined as the heating profile. Through the use of the suitably selected fin widths, even when the various evaporator or steam generator tubes are heated to a greatly differing extent, an introduction of heat into all the evaporator or steam generator tubes can be achieved which is such that temperature differences at the outlet of the evaporator or steam generator tubes are kept particularly low. Premature material fatigues are reliably prevented in this way. The steam generator consequently has a particularly long useful life.

The horizontal gas flue advantageously has provided in it a number of superheater heating surfaces which are provided approximately perpendicularly to the main direction of flow of the fuel gas and the tubes of which are connected in parallel for a throughflow of the flow medium. These superheater heating surfaces, provided in a suspended form of construction and also designated as bulkhead heating surfaces, are heated predominantly by convection and follow the evaporator tubes of the combustion chamber on the flow-medium side. A particularly favorable utilization of the fuel-gas heat is thereby ensured.

The vertical gas flue advantageously has a number of convection heating surfaces which are formed from tubes disposed approximately perpendicularly to the main direction of flow of the fuel gas. These tubes of a convection heating surface are connected in parallel for a throughflow of the flow medium. These convection heating surfaces, too, are heated predominantly by convection.

In order, furthermore, to ensure a particularly full utilization of the heat of the fuel gas, the vertical gas flue advantageously has an economizer.

The burners are advantageously provided on the end wall of the combustion chamber, that is to say on that containment wall of the combustion chamber which is located opposite the outflow orifice to the horizontal gas flue. A steam generator configured in this way can be adapted particularly simply to the burnup length of the fuel. The burnup length of the fuel is to be understood, here, as the fuel-gas velocity in the horizontal direction at a specific average fuel-gas temperature, multiplied by the burnup time $t_A$ of the fuel. The maximum burnup length for the respective steam generator is obtained, in this case, at the steam power output of the steam generator under full load, the so-called full-load operating mode of the steam generator. The burnup time $t_A$, in turn, is the time which, for example, a coaldust grain of average size requires to burn up completely at a specific average fuel-gas temperature.

In order to keep material damage and undesirable pollution of the horizontal gas flue, for example due to the introduction of high-temperature molten ash, particularly low, the length L of the combustion chamber, defined by the distance from the end wall to the inlet region of the horizontal gas flue, is advantageously at least equal to the burnup length of the fuel in the full-load operating mode of the steam generator. This length L of the combustion chamber will generally be greater than the height of the combustion chamber, measured from the funnel top edge to the combustion chamber ceiling.

In an advantageous embodiment, for the particularly favorable utilization of the combustion heat of the fossil fuel, the length L (given in m) of the combustion chamber is selected as a function of the BMCR value W (given in kg/s) of the steam generator, of the burnup time $t_A$ (given in s) of the fuel and of the outlet temperature $T_{BRK}$ (given in ° C.) of the fuel gas from the combustion chamber. BMCR stands for Boiler Maximum Continuous Rating and is the term conventionally used internationally for the highest continuous power output of the steam generator. This also corresponds to the design power output, that is to say to the power output in the full-load operating mode of the steam generator. In this case, with a given BMCR value W of the steam generator, the higher value of the two functions (1) and (2) substantially applies to the length L of the combustion chamber:

$$L(W, t_A) = (C_1 + C_2 \cdot W) \cdot t_A \qquad (1)$$

and $$L(W, T_{BRK}) = (C_3 \cdot T_{BRK} + C_4)W + C_5(T_{BRK})^2 + C_6 \cdot T_{BRK} + C_7 \qquad (2)$$

with $C_1$=8 m/s and
$C_2$=0.0057 m/kg and $C_3 = -1.905 \cdot 10^{-4}$ (m·s)/(kg·° C.) and
$C_4 = 0.286$ (s·m)/kg and
$C_5 = 3 \cdot 10^{-4}$ m/(° C.)$^2$ and
$C_6 = -0.842$ m/° C. and
$C_7 = 603.41$ m.

"Substantially" is to be understood, here, as a permissible deviation of +20%/−10% from the value defined by the respective function.

The advantages achieved through the use of the invention are, in particular, that, due to the series connection of the first group of evaporator tubes with the second group of evaporator tubes, particularly low temperature differences between adjacent evaporator tubes when the steam generator is in operation are ensured even in a horizontal combustion chamber. In this case, the length of the combustion chamber is configured in such a way that a particularly favorable utilization of the combustion heat of the fossil fuel is ensured. Moreover, configuring the combustion chamber for the fuel gas to flow through in an approximately horizontal direction affords a particularly compact form of construction of the steam generator. This makes it possible, when the steam generator is incorporated into a steam turbine plant, to have particularly short connecting pipes from the steam generator to the steam turbine.

Other features which are considered as characteristic for the invention are set forth in the appended claims.

Although the invention is illustrated and described herein as embodied in a fossil-fired steam generator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
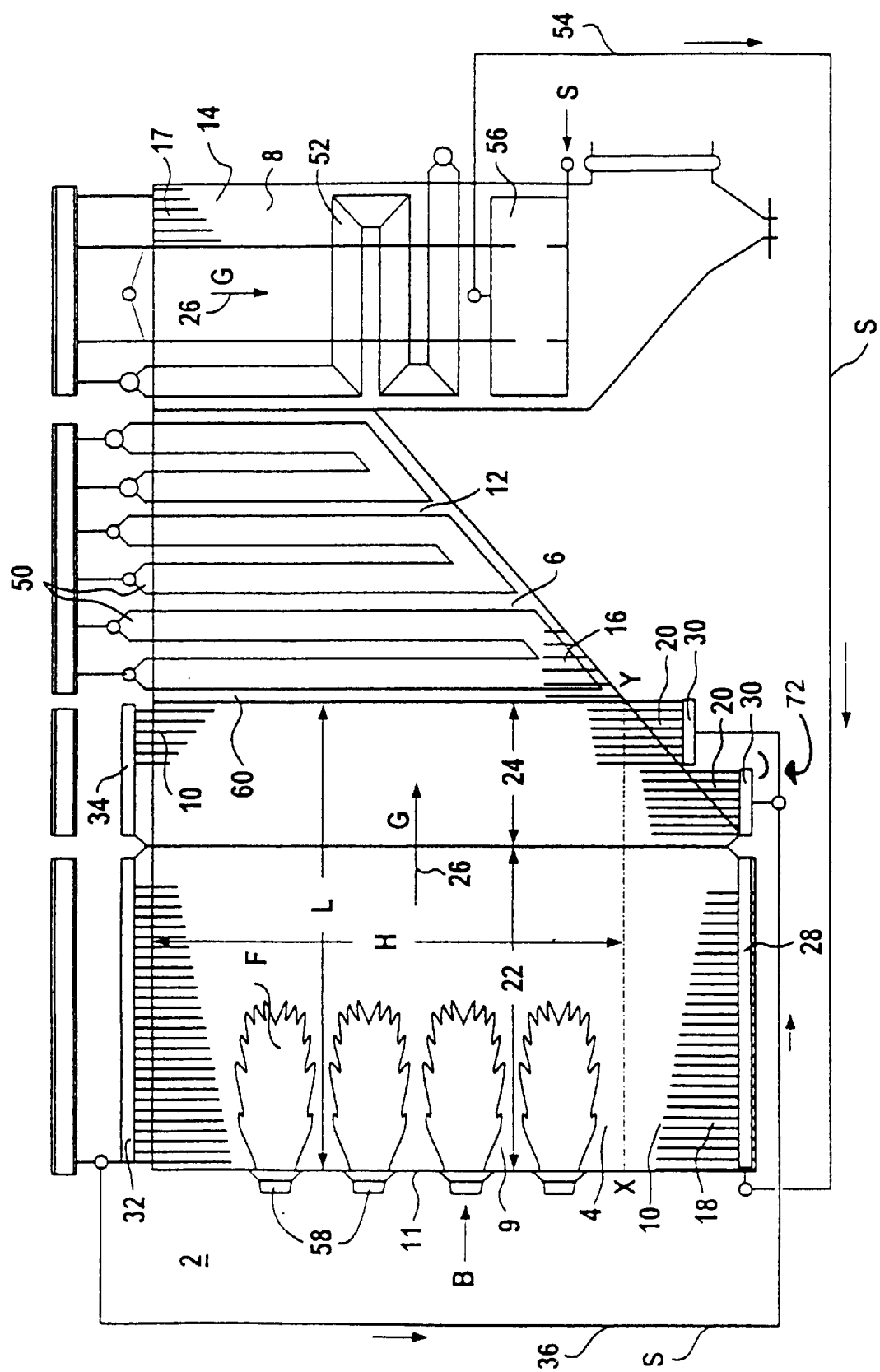
FIG. 1 is diagrammatic side view of a fossil-fired steam generator of the two-flue type according to the invention.

Referring now to the figures of the drawings in detail, in which parts corresponding to one another are indicated with the same reference symbols in all the figures, and first, particularly, to FIG. 1 thereof, there is shown a steam generator 2 which is assigned to a power plant which includes a steam turbine plant. The steam generated in the steam generator is utilized in this case for driving the steam turbine itself which, in turn, drives a generator for current generation. In this case, the current generated by the generator is provided for feeding into an interconnected network or an "island network." Furthermore, there may also be provision for branching off a portion of the steam for feeding into an external process which is connected to the steam turbine plant and which may also be a heating process.

The fossil-fired steam generator 2 is advantageously configured as a continuous-flow steam generator. It includes a combustion chamber 4 which is followed on the fuel-gas side, via a horizontal gas flue 6, by a vertical gas flue 8.

The containment walls 9 of the combustion chamber 4 are formed from vertically disposed evaporator tubes 10 welded to one another in a gastight manner. In this case, one containment wall 9 is the end wall 11 of the combustion chamber 4 of the steam generator 2. In addition, the side walls 12 of the horizontal gas flue 6 and/or the side walls 14 of the vertical gas flue 8 may also be formed from vertically disposed steam generator tubes 16 and 17 welded to one another in a gastight manner. In this instance, the steam generator tubes 16, 17 can be acted upon in each case in parallel by the flow medium S.

Moreover, a number of the evaporator tubes 10 of the containment walls 9 of the combustion chamber 4 are subdivided into a first group 18 and a second group 20. In this case, the evaporator tubes 10 of a group 18 or 20 are capable of being acted upon in each case in parallel by the flow medium S. At the same time, the first group 18 of the evaporator tubes 10 is provided in a first region 22 of the combustion chamber 4 and the second group 20 of the evaporator tubes 10 is provided in a second region 24 of the combustion chamber 4. The second region 24 of the combustion chamber 4 is in this case provided between the first region 22 of the combustion chamber 4 and the horizontal gas flue 6 with respect to the approximately horizontal main direction of flow 26 of the fuel gas G.

The first group 18 and the second group 20 of the evaporator tubes 10 of the combustion chamber 4 are, on the flow-medium side, preceded in each case by an inlet header system 28 and 30 for flow medium S and followed in each case by an outlet header system 32 and 34. At the same time, the outlet header system 32 of the first group 18 of the evaporator tubes 10 is connected via a line system 36 to the inlet header system 30 of the second group 20 of the evaporator tubes 10. Through the use of the header systems 28, 30 and 30, 34, pressure compensation between the parallel-connected evaporator tubes 10 is possible, which brings about a favorable distribution of the flow medium S during the flow through the evaporator tubes 10.

In order to achieve a particularly favorable throughflow characteristic of the flow medium S through the containment walls 9 of the combustion chamber 4 and consequently a particularly good utilization of the combustion heat of the fossil fuel B, the evaporator tubes 10 of the end wall 11 of the combustion chamber 4 which can be acted upon in parallel by flow medium S precede the first group 18 of the evaporator tubes 10 of the combustion chamber 4 on the flow-medium side.

Figure 2:
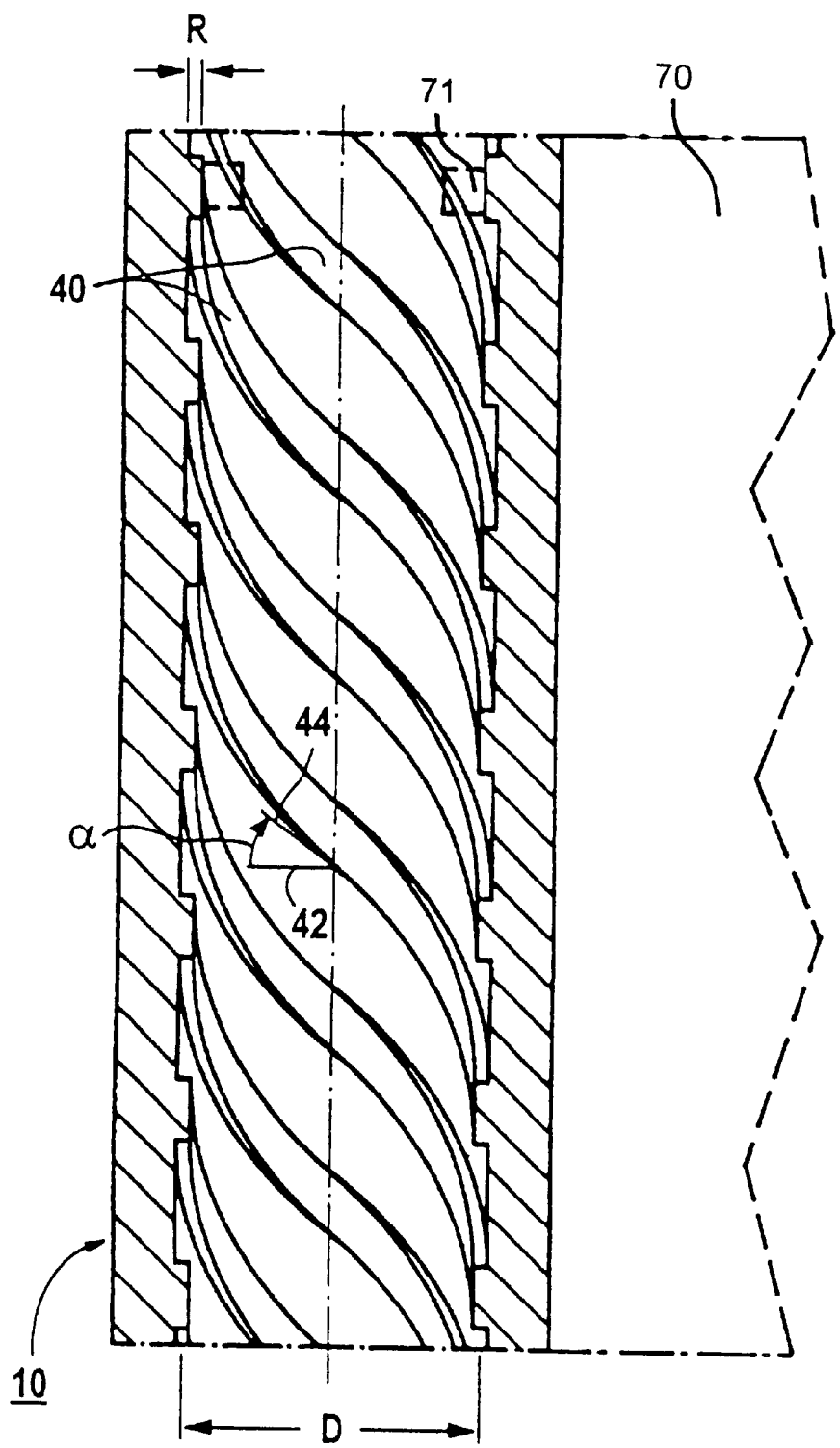
FIG. 2 is a diagrammatic, longitudinal sectional view of an individual evaporator tube.

As illustrated in FIG. 2, the evaporator tubes 10 have, on their inside, ribs 40 which form a type of multistart thread and have a rib height R. In this case, the pitch angle α of between a plane 42 perpendicular to the tube axis and the flanks 44 of the ribs 40 provided on the tube inside is smaller than 55°. As a result, particularly high heat transmission from the inner wall of the evaporator tubes to the flow medium S carried in the evaporator tubes 10 is achieved, the tube wall at the same time having particularly low temperatures.

The tube inside diameter D of the evaporator tubes 10 of the combustion chamber 4 is selected as a function of the respective position of the evaporator tubes 10 in the combustion chamber 4. The steam generator 2 is thereby adapted to the different heating of the evaporator tubes 10. This design of the evaporator tubes 10 of the combustion chamber 4 ensures particularly reliably that temperature differences at the outlet of the evaporator tubes 10 are kept particularly low.

Adjacent evaporator or steam generator tubes 10, 16, 17 are welded to one another in a gastight manner via fins 70 which are only schematically illustrated in FIG. 2. To be precise, the heating of the evaporator or steam generator tubes 10, 16, 17 can be influenced by a suitable choice of the fin width. The respective fin width is therefore adapted to a heating profile which is predeterminable on the gas side and which depends on the position of the respective evaporator or steam generator tube 10, 16, 17 in the steam generator. The heating profile may in this case be a typical heating profile determined from experimental values or else a rough estimation. Temperature differences at the outlet of the evaporator or steam generator tubes 10, 16, 17 are thereby kept particularly low even when the evaporator or steam generator tubes 10, 16, 17 are heated to a greatly differing extent. Material fatigues are thereby reliably prevented, thus ensuring that the steam generator 2 has a long useful life.

Some of the evaporator tubes 10 are equipped with throttle devices 71, which are only schematically illustrated by dashed lines in FIG. 2. These throttle devices 71 are provided for reducing the throughflow of the flow medium S. The throttle devices are configured as orifice plates with an aperture or as perforated diaphragms reducing the tube inside diameter D and, when the steam generator 2 is in operation, bring about a reduction in the throughput of the flow medium S in the evaporator tubes 10 heated to a lesser extent, with the result that the throughput of the flow medium S is adapted to the heating. Furthermore, one or more lines of the line system 36, which are not illustrated in any more detail in the drawing, are equipped with schematically shown throttle devices 72, in particular throttle valves or throttle fittings, for reducing the throughput of the flow medium S in the second group 20 of the evaporator tubes 10 of the combustion chamber 4.

It must be noted, with regard to the tubing of the combustion chamber 4, that the individual evaporator tubes 10 welded to one another in a gastight manner are heated to a greatly differing extent when the steam generator 2 is in operation. The configuration of a group 18 or 20 of the evaporator tubes 10 in terms of its internal ribbing, the fin connection to adjacent evaporator tubes 10 of a group 18 or 20 and their tube inside diameter D is therefore selected such that, despite being heated differently, all the evaporator tubes 10 of a group 18 or 20 have approximately the same outlet temperatures and sufficient cooling of all the evaporator tubes 10 is ensured for all operating states of the steam generator 2. This is ensured, in particular, in that the steam generator 2 is configured for a comparatively low mass flow density of the flow medium S flowing through the evaporator tubes 10. Moreover, what is achieved by a suitable choice of the fin connections and of the tube inside diameters D is that the fraction of frictional pressure loss in the total pressure loss is so low that a natural-circulation behavior is established: the flow passes to a greater extent through evaporator tubes 10 of a group 18 or 20 which are heated to a greater extent than through evaporator tubes 10 of a group 18 or 20 which are heated to a lesser extent. What is also achieved thereby is that the comparatively highly heated evaporator tubes 10 of one of the groups 18 and 20 in proximity to the burners receive approximately as much heat specifically, with respect to the mass flow, as the comparatively lightly heated evaporator tubes 10 of the same group 18 or 20 which, in comparison, are provided nearer to the end of the combustion chamber. A further measure for adapting the flow through the evaporator tubes 10 of the combustion chamber 4 to the heating is to fit throttles into some of the evaporator tubes 10 or into some of the lines of the line system 36. The internal ribbing is in this case configured in such a way as to ensure sufficient cooling of the evaporator tube walls in both groups 18 and 20 of the evaporator tubes 10. Thus, through the use of the above-mentioned measures, all the evaporator tubes 10 of a group 18 or 20 have approximately the same outlet temperatures.

The horizontal gas flue 6 has a number of superheater heating surfaces 50 which are configured as bulkhead heating surfaces and which are provided in a suspended form of construction approximately perpendicularly to the main direction of flow 26 of the fuel gas G and the tubes of which are in each case connected in parallel for a throughflow of the flow medium S. The superheater heating surfaces are heated predominantly by convection and follow the evaporator tubes 10 of the combustion chamber 4 on the flow-medium side.

The vertical gas flue 8 has a number of convection heating surfaces 52 which can be heated predominantly by convection and are formed from tubes provided approximately perpendicularly to the main direction of flow 26 of the fuel gas G. These tubes are in each case connected in parallel for a throughflow of the flow medium S and are integrated into the path of the flow medium S. An economizer 56 is also provided in the vertical gas flue 8. The economizer 56 is connected on the outlet side, via a line system 54, to the inlet header system 28 assigned to the first group 18 of evaporator tubes 10. In this case, one or more lines of the line system 54, which are not illustrated in detail in the drawing, may have throttle fittings for reducing the throughflow of the flow medium S. The vertical gas flue 8 issues on the outlet side into an air preheater and from there, via a dust filter, into a chimney. The components following the vertical gas flue 8 are not illustrated in any detail in the drawing.

The steam generator 2 is configured with a horizontal combustion chamber having a particularly low overall height and can therefore be set up at a particularly low outlay in terms of production and assembly. For this purpose, the combustion chamber 4 of the steam generator 2 has a number of burners 58 for fossil fuel B which are provided at the same a height level as the horizontal gas flue 6 on the end wall 11 of the combustion chamber 4.

So that the fossil fuel B burns up particularly completely to achieve a particularly high efficiency and to prevent material damage to the first superheater heating surface 50 of the horizontal gas flue 6, as seen on the fuel-gas side, and pollution of this surface, for example due to the introduction of high-temperature molten ash, in a particularly reliable way, the length L of the combustion chamber 4 is selected such that it exceeds the burnup length of the fuel B in the full-load operating mode of the steam generator 2. The length L is in this case the distance from the end wall 11 of the combustion chamber 4 to the inlet region 60 of the horizontal gas flue 6. The burnup length of the fuel B is defined here as the fuel-gas velocity in the horizontal direction at a specific average fuel-gas temperature, multiplied by the burnup time $t_A$ of the fuel B. The maximum burnup length for the respective steam generator 2 is obtained in the full-load operating mode of the steam generator 2. The burnup time $t_A$ of the fuel B is, in turn, the time which, for example, a coaldust grain of average size requires in order to burn up completely at a specific average fuel-gas temperature.

In order to ensure a particularly favorable utilization of the combustion heat of the fossil fuel B, the length L (given in m) of the combustion chamber 4 is suitably selected as a function of the outlet temperature of the fuel gas G from the combustion chamber 4 $T_{BRK}$ (given in ° C.), of the burnup time $t_A$ (given in s) of the fuel B and of the BMCR value W (given in kg/s) of the steam generator 2. BMCR stands here for Boiler Maximum Continuous Rating. The BMCR value W is a term conventionally used internationally for the highest continuous power output of a steam generator. This also corresponds to the design power output, that is to say to the power output in full-load operating mode of the steam generator. This horizontal length L of the combustion chamber 4 is in this case greater than the height H of the combustion chamber 4.

The height H is in this case measured from the funnel top edge of the combustion chamber 4, marked in FIG. 1 by the line having the end points X and Y, to the combustion chamber ceiling. In this case, the length L of the combustion chamber 4 is determined approximately via the two functions (1) and (2)

$$L(W, t_A) = (C_1 + C_2 \cdot W) \cdot t_A \quad (1)$$

and $$L(W, T_{BRK}) = (C_3 \cdot T_{BRK} + C_4)W + C_5(T_{BRK})^2 + C_6 \cdot T_{BRK} + C_7 \quad (2)$$

with $C_1$=8 m/s and
$C_2$=0.0057 m/kg and
$C_3$=−1.905·10$^{-4}$ (m·s)/(kg° C.) and
$C_4$=0.286 (s·m/kg and
$C_5$=3·10$^{-4}$ m/(° C.)$^2$ and
$C_6$=−0.842 m/° C. and
$C_7$=603.41 m.

What is to be understood here by approximately is a permissible deviation of +20%/−10% from the value defined by the respective function. In this case, in any desired, but fixed BMCR value W of the steam generator, the higher value from the functions (1) and (2) always applies to the length L of the combustion chamber 4.

Figure 3:
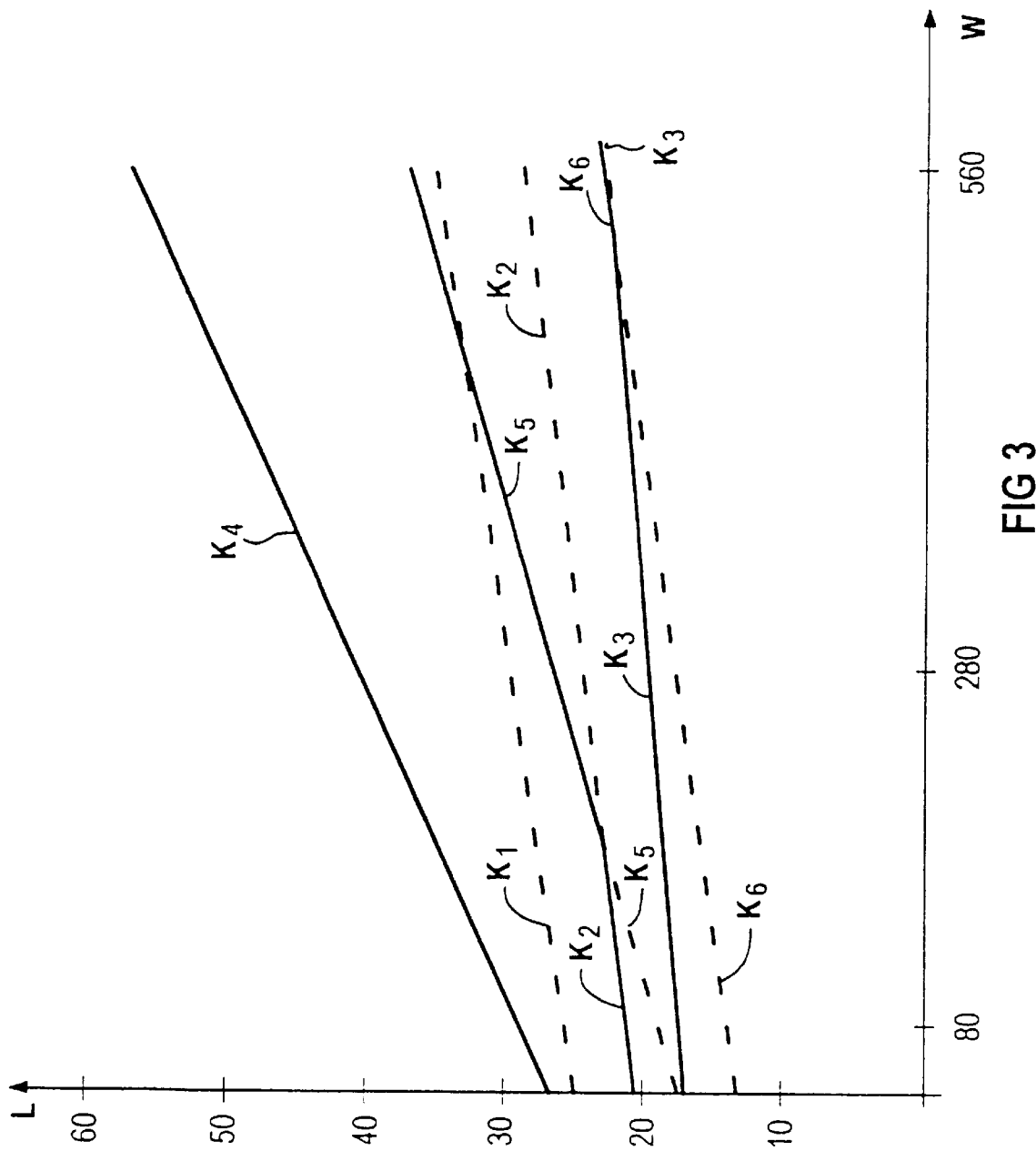
FIG. 3 is a graph for illustrating a coordinate system with the curves $K_1$ to $K_6$.

As an example of a calculation of the length L of the combustion chamber 4 as a function of the BMCR value W of the steam generator 2, six curves $K_1$ to $K_6$ are plotted in the coordinate system according to FIG. 3. The curves are in each case assigned the following parameters here:

$K_1$: $t_A$=3 s according to (1),
$K_2$: $t_A$=2.5 s according to (1),
$K_3$: $t_A$=2 s according to (1),
$K_4$: $T_{BRK}$=1200° C. according to (2),
$K_5$: $T_{BRK}$=1300° C. according to (2) and,
$K_6$: $T_{BRK}$=1400° C. according to (2).

Thus, for example for a burnup time $t_A$=3 s and an outlet temperature $T_{BRK}$=1200° C. of the fuel gas G from the combustion chamber 4, the curves $K_1$ and $K_4$ are to be used in order to determine the length L of the combustion chamber 4. This results, in the case of a predetermined BMCR value W of the steam generator 2 of W=80 kg/s in a length of L=29 m according to $K_4$,
of W=160 kg/s in a length of L=34 m according to $K_4$,
of W=560 kg/s in a length of L=57 m according to $K_4$.

For example, the curves $K_2$ and $K_5$ are to be used for the burnup time $t_A$=2.5 s and the outlet temperature of the fuel gas G from the combustion chamber $T_{BRK}$=1300° C. This results in the case of a predetermined BMCR value W of the steam generator 2 of W=80 kg/s in a length of L=21 m according to $K_2$,
of W=180 kg/s in a length of L=23 m according to $K_2$ and $K_5$,
of W=560 kg/s in a length of L=37 m according to $K_5$.

A burnup time $t_A$=2 s and the outlet temperature of the fuel gas G from the combustion chamber $T_{BRK}$=1400° C. are assigned, for example, the curves $K_3$ and $K_6$. This results in the case of a predetermined BMCR value W of the steam generator 2 of W=80 kg/s in a length of L=18 m according to $K_3$,
of W=465 kg/s in a length of L=21 m according to $K_3$ and $K_6$,
of W=560 kg/s in a length of L=23 m according to $K_6$.

When the steam generator 2 is in operation, fossil fuel B is supplied to the burners 58. The flames F of the burners 58 are in this case oriented horizontally. Due to the form of construction of the combustion chamber 4, a flow of the fuel gas G occurring during combustion is generated in an approximately horizontal main direction of flow 26. This fuel gas passes via the horizontal gas flue 6 into the vertical gas flue 8 oriented approximately toward the ground and leaves the vertical gas flue in the direction of the chimney, which is not illustrated in detail.

Flow medium S entering the economizer 56 passes via the line system 54 into the inlet header system 28 of the first group 18 of the evaporator tubes 10 of the combustion chamber 4 of the steam generator 2. In the first group 18 of the vertically disposed evaporator tubes 10 of the combustion chamber 4 of the steam generator 2 which are welded to one another in a gastight manner, evaporation and, if appropriate, partial superheating of the flow medium S take place. The steam or a water/steam mixture that is thus generated is collected in the outlet header system 32 for the flow medium S. The steam or the water/steam mixture passes from there, via the line system 36, into the inlet header system 30 assigned to the second group 20 of evaporator tubes 10. The steam or the water/steam mixture generated in the second group 20 of the evaporator tubes 10 passes via the outlet header system 34 into the walls of the horizontal gas flue 6 and of the vertical gas flue 8 and from there, in turn, into the superheater heating surfaces 50 of the horizontal gas flue 6. In the superheater heating surfaces 50, further superheating of the steam takes place, the latter subsequently being supplied for utilization, for example for driving a steam turbine.

Through the use of the formation of the groups of the evaporator tubes 10 of the combustion chamber 4, particularly low temperature differences between adjacent evaporator tubes 10 in all load states of the steam generator 2 are ensured in a particularly simple way. As a result, temperature differences in the inlet region of the flow medium S between adjacent evaporator tubes 10 of the end wall 11 and the first region 22 and, respectively, of the first region and the second region 24 are comparatively lower than if the end wall 11 were to be directly contiguous to the second region 24. Moreover, the temperature difference between indirectly or directly adjacent evaporator tubes 10 of the second region 24 and the steam generator tubes 16 of the horizontal gas flue 6 is also comparatively lower than would be the case without a series connection of the groups 18 and 20 of the evaporator tubes 10.

At the same time, selecting the length L of the combustion chamber 4 as a function of the BMCR value W of the steam generator 2 ensures that the combustion heat of the fossil fuel B is utilized particularly reliably. Moreover, by virtue of its particularly low overall height and its compact form of construction, the steam generator 2 can be set up at a particularly low outlay in terms of production and assembly. In this case, a framework that can be set up at a comparatively low technical outlay may be provided. Furthermore, in a steam turbine plant with the steam generator 2 having such a low overall height, the connecting pipes from the steam generator 2 to the steam turbine can be made particularly short.

We claim:

1. A steam generator, comprising:
   a combustion chamber for fossil fuel, said combustion chamber having a fuel-gas side;
   a horizontal gas flue;
   a vertical gas flue connected, via said horizontal gas flue, on said fuel-gas side to said combustion chamber;
   said combustion chamber having burners provided substantially on a level with said horizontal gas flue;
   said combustion chamber having containment walls formed from vertically disposed evaporator tubes welded to one another in a gastight manner;
   a number of said evaporator tubes being subdivided into a first group and a second group, said first group and said second group of said evaporator tubes to be acted upon in each case in parallel by a flow medium;
   said second group being provided in series with said first group and downstream of said first group as seen in a direction of flow of the flow medium;
   said containment walls of said combustion chamber being subdivided into a first region and a second region along a main flow direction of a fuel gas flow;
   said first region being formed from evaporator tubes of said first group and said second region being formed from evaporator tubes of said second group; and
   said second region being provided, on said fuel-gas side, between said first region and said horizontal gas flue.

2. The steam generator according to claim 1, wherein said first group and said second group of said evaporator tubes, on a flow-medium side thereof, are preceded in each case by a common inlet header system for the flow medium and are followed by a common outlet header system.

3. The steam generator according to claim 1, wherein:
   one of said containment walls of said combustion chamber is an end wall; and
   given ones of said evaporator tubes are disposed at said end wall such that said given ones of said evaporator tubes are acted upon in parallel by the flow medium.

4. The steam generator according to claim 1, wherein:
   one of said containment walls of said combustion chamber is an end wall; and
   given ones of said evaporator tubes are disposed at said end wall such that said given ones of said evaporator tubes at said end wall precede said first group of said evaporator tubes on a flow-medium side thereof.

5. The steam generator according to claim 1, wherein a given number of said evaporator tubes has a respective inside diameter selected as a function of a respective position of said given number of said evaporator tubes in said combustion chamber.

6. The steam generator according to claim 1, wherein a given number of said evaporator tubes each have a respective inner side with ribs forming a multistart thread.

7. The steam generator according to claim 1, wherein:
   each of a given number of said evaporator tubes defines a tube axis and has an inner side with ribs having flanks; and
   said ribs form a multistart thread having a pitch angle of less than 60°, the pitch angle extending between a plane perpendicular to the tube axis and said flanks of said ribs.

8. The steam generator according to claim 1, wherein:
   each of a given number of said evaporator tubes defines a tube axis and has an inner side with ribs having flanks; and
   said ribs form a multistart thread having a pitch angle of less than 55°, the pitch angle extending between a plane perpendicular to the tube axis and said flanks of said ribs.

9. The steam generator according to claim 1, wherein each of a given number of said evaporator tubes has a throttle device.

10. The steam generator according to claim 1, including a line system provided for supplying the flow medium into said evaporator tubes of said combustion chamber, said line system including throttle devices for reducing a throughflow of the flow medium.

11. The steam generator according to claim 1, including a line system provided for supplying the flow medium into said evaporator tubes of said combustion chamber, said line system including throttle devices selected from the group consisting of throttle fittings and throttle valves for reducing a throughflow of the flow medium.

12. The steam generator according to claim 1, wherein said horizontal gas flue has side walls formed from vertically disposed steam generator tubes welded to one another in a gastight manner such that said steam generator tubes are acted upon in parallel by the flow medium.

13. The steam generator according to claim 1, wherein said vertical gas flue has side walls formed from vertically disposed steam generator tubes welded to one another in a gastight manner such that said steam generator tubes are acted upon in parallel by the flow medium.

14. The steam generator according to claim 1, including:
   fins having a respective fin width;
   adjacent ones of said evaporator tubes being welded to one another in a gastight manner via said fins; and
   said fin width being selected as a function of a respective position of said evaporator tubes in said combustion chamber.

15. The steam generator according to claim 12, including:
   fins having a respective fin width;
   adjacent ones of said steam generator tubes being welded to one another in a gastight manner via said fins; and
   said fin width being selected as a function of a respective position of said steam generator tubes in said horizontal gas flue.

16. The steam generator according to claim 13, including:
   fins having a respective fin width;
   adjacent ones of said steam generator tubes being welded to one another in a gastight manner via said fins; and
   said fin width being selected as a function of a respective position of said steam generator tubes in said vertical gas flue.

17. The steam generator according to claim 1, including a number of superheater heating surfaces suspended in said horizontal gas flue.

18. The steam generator according to claim 1, including a number of convection heating surfaces provided in said vertical gas flue.

19. The steam generator according to claim 1, wherein:
   one of said containment walls of said combustion chamber is an end wall; and
   said burners are provided on said end wall.

20. The steam generator according to claim 1, wherein:
   one of said containment walls of said combustion chamber is an end wall;

said horizontal gas flue has an inlet region; and said combustion chamber has a given length defined by a distance between said end wall of said combustion chamber and said inlet region of said horizontal gas flue, the given length is at least equal to a burnup length of the fossil fuel during a full-load operation.

21. The steam generator according to claim 1, wherein:

said combustion chamber has a given length L, the given length L being approximated based on a first function $$L(W, t_A) = (C_1 + C_2 \cdot W) \cdot t_A$$

and a second function $$L(W, T_{BRK}) = (C_3 \cdot T_{BRK} + C_4)W + C_5(T_{BRK})^2 + C_6 \cdot T_{BRK} + C_7$$

wherein W is a BMCR value, $t_A$ is a burnup time of said burners, $T_{BRK}$ is an outlet temperature of a fuel gas from said combustion chamber, and wherein in each case a relatively higher one of the values for the given length L of said combustion chamber is used as the BMCR value W, and wherein $C_1 = 8$ m/s and $C_2 = 0.0057$ m/kg and $C_3 = -1.905 \cdot 10^{-4}$ (m·s)/(kg° C.) and $C_4 = 0.2857$ (s·m)/kg and $C_5 = 3 \cdot 10^{-4}$ m/(° C.)$^2$ and $C_6 = -0.8421$ m/° C. and $C_7 = 603.4125$ m.

* * * * *